(12) United States Patent
Stephan et al.

(10) Patent No.: US 11,118,737 B2
(45) Date of Patent: Sep. 14, 2021

(54) COMPACT GAS CYLINDER VALVE WITH RESIDUAL PRESSURE FUNCTION

(71) Applicant: LUXEMBOURG PATENT COMPANY S.A., Lintgen (LU)

(72) Inventors: Sellen Stephan, Wehingen (DE); Philippe Schmitz, Steinsel (LU)

(73) Assignee: Luxembourg Patent Company S.A., Lintgen (LU)

(*) Notice: Subject to any disclaimer, the term of this patent is extended or adjusted under 35 U.S.C. 154(b) by 108 days.

(21) Appl. No.: 16/617,072

(22) PCT Filed: Apr. 26, 2018

(86) PCT No.: PCT/EP2018/060692
§ 371 (c)(1),
(2) Date: Nov. 26, 2019

(87) PCT Pub. No.: WO2018/215159
PCT Pub. Date: Nov. 29, 2018

(65) Prior Publication Data
US 2020/0173609 A1  Jun. 4, 2020

(30) Foreign Application Priority Data
May 26, 2017 (LU) .................................. LU 100263

(51) Int. Cl.
*F17C 13/04* (2006.01)
*F16K 1/30* (2006.01)

(52) U.S. Cl.
CPC .............. *F17C 13/04* (2013.01); *F16K 1/30* (2013.01); *F16K 1/304* (2013.01);
(Continued)

(58) Field of Classification Search
CPC .............. F17C 13/04; F17C 2205/0314; F17C 2205/0329; F17C 2205/0332;
(Continued)

(56) References Cited

U.S. PATENT DOCUMENTS 4,372,343 A * 2/1983 Trinkwalder, Jr. ...... F17C 13/04
                                                              137/493
5,738,145 A * 4/1998 Daicho ................... F16K 1/305
                                                              137/878

(Continued)

FOREIGN PATENT DOCUMENTS

DE    10137361 C1    1/2003
EP    0903533 A2     3/1999
FR    2958006 A1     9/2011

OTHER PUBLICATIONS

International Search Report dated Jun. 29, 2018 for Parent PCT Appl. No. PCT/EP2018/060692.

*Primary Examiner* — Mary E McManmon
*Assistant Examiner* — Stephanie A Shrieves
(74) *Attorney, Agent, or Firm* — James E. Walton

(57) ABSTRACT

The invention is directed to a gas cylinder valve (2) comprising a body (4) with an inlet (18), an outlet (40) and a passage (20) fluidly interconnecting said inlet and outlet; a shut-off device (22) with a seat (26) formed in the passage (20) and a shutter (24) movable along a longitudinal axis (7) for cooperating with said seat; a spindle (12) rotatably mounted on the body (4) along the longitudinal axis (7) and cooperating with the shutter (24) such as to move said shutter upon rotation of said spindle; a residual pressure device (28) fluidly downstream of the shut-off device (22), with a seat (32) formed in the passage (20) and a piston (30) movable along a transversal axis (38. At least one of the
(Continued)

shutter (24) and the piston (30) shows a recess or opening (24.4) accommodating the other of said shutter and piston.

15 Claims, 5 Drawing Sheets

(52) U.S. Cl.
CPC ............... *F17C 2205/0314* (2013.01); *F17C 2205/0329* (2013.01); *F17C 2205/0332* (2013.01); *F17C 2205/0385* (2013.01); *F17C 2227/048* (2013.01)

(58) Field of Classification Search
CPC ........ F17C 2205/0385; F17C 2227/048; F17C 2201/056; F17C 2201/058; F16K 1/304; F16K 1/30; F16K 35/14; F16K 11/20; F16K 31/44
USPC .............................................. 137/588, 637.1
See application file for complete search history.

(56) References Cited

U.S. PATENT DOCUMENTS

| | | | | |
|---|---|---|---|---|
| 6,047,727 A * | 4/2000 | Hatori | ...................... | F16K 1/305 137/505.25 |
| 2001/0015230 A1* | 8/2001 | Takeda | ................... | F16K 1/306 137/877 |
| 2012/0118402 A1* | 5/2012 | Birch | ..................... | F16K 1/305 137/237 |
| 2014/0048169 A1* | 2/2014 | Pisot | ......................... | F17C 5/06 141/4 |
| 2016/0356426 A1* | 12/2016 | Maekawa | ............... | F16K 1/465 |

* cited by examiner

COMPACT GAS CYLINDER VALVE WITH RESIDUAL PRESSURE FUNCTION

TECHNICAL FIELD

The invention is directed to the field of valves for compressed gas, more particularly for gas cylinders.

BACKGROUND ART

Prior art patent document published US 2012/00118402 A1 discloses a gas cylinder valve with a manual shut-off device and a residual pressure device. The shut-off device comprises a shutter movable in rotation and translation cooperating with a seat formed in the valve body. The movement of the shutter is operated by rotation of a handwheel mounted on a rotating spindle. The spindle is in rotational engagement with the shutter whereas said shutter is in threaded engagement with the body. The rotation of the spindle causes therefore rotation of the shutter which then not only rotates but also moves in translation. The residual pressure device is arranged fluidly downstream of the shut-off device. It comprises a piston with a main portion and a front portion configured for sealingly cooperating with a seat formed in the body, in direct connection with the gas outlet of the valve. The piston is urged by a spring towards said seat so as to close the passage. When the shut-off device is opened, gas pressure builds up around the main portion of the piston and exerts a force thereon resulting from the cross-section difference between the gasket of the front portion resting on the seat and the gasket of the main portion slidingly cooperating with a bore in the body. This resulting force counteracts the force of the spring and moves the piston when the inlet pressure is above a predetermined value, usually comprised between 1 and 10 bar. This means that the valve is opened only when gas is flowing out of the cylinder. When the cylinder is becoming empty, as soon as the pressure drops down to the above predetermined value, the residual pressure device does not open anymore, thereby avoiding the interior of the cylinder to be fluidly in contact with the ambient air. This avoids contamination of the cylinder.

The gas outlet of the above device serves also for refilling the gas cylinder. To avoid any unauthorized refilling, the piston of the residual pressure device comprises a gas channel interconnecting the gas outlet with the chamber formed by the back side of the piston. If an unsuitable fitting is used for refilling the gas cylinder, the refilling pressure will build up in the chamber at the back of the piston, resulting in a force on the piston, due to the different in cross-section between the main portion and the front portion, urging the piston towards the seat. The higher the refill pressure is the higher is the force on the piston urging it against the seat. For refilling the gas cylinder, a special fitting is necessary for mechanically moving the piston to an open position. To the end, the special fitting comprises a special pin.

In the above teaching, the piston is movable along a transversal axis that is perpendicular to the longitudinal axis along which the shutter is movable. The residual pressure device is located at the side of the shutter, resulting in a bulky portion in the body for housing said device. The body is integrally formed of brass. The cost of the body is an important part of the production cost of such a valve. The bulky portion provided in the body for housing the residual pressure device causes therefore a significant additional cost. In addition, the machine to produce the offset bore holes is generally more expensive compared to inline concepts (i.e. where the outlet housing a residual pressure device is located next to the shut-off device and aligned in a plane comprising the longitudinal axis of the valve), so that not only the material but also the geometry causes a significant additional cost.

Patent document published DE 101 37 361 C1 discloses a gas cylinder valve similar to the one of the above teaching. Contrary to the above teaching, the residual pressure device is located, with respect to the longitudinal axis, below the seat of the shut-off device. This allows to reduce the size of the bulk portion but increases the height of the body. However, the increased height of the body leads to a reduced side impact resistance, whereas such a resistance is required by certification standards. In other words this design does not help in reducing the amount of material forming the body.

SUMMARY OF INVENTION

Technical Problem

The invention has for technical problem to overcome at least one of the drawbacks of the above cited prior art. More specifically, the invention has for technical problem to provide a valve with a shut-off device and a residual pressure device and that shows a reduced amount of material, for instance brass, for the body as well as a compact design, which has a high resistance against side impact loads due to its stiffness. Also simple machining and deburring of the valve body are required As there are many different types of outlet connections having different sealing concepts, the solution needs to cover internal cone sealing concepts and face gaskets, which is not possible with the state of the art inline concepts with limited mass flow capacity.

Technical Solution

The invention is directed to a gas cylinder valve comprising a body with an inlet, an outlet and a passage fluidly interconnecting said inlet and outlet; a shut-off device with a seat formed in the passage and a shutter movable along a longitudinal axis for cooperating with said seat; a spindle rotatably mounted on the body along the longitudinal axis and cooperating with the shutter such as to move said shutter upon rotation of said spindle; a residual pressure device fluidly downstream of the shut-off device, with a seat formed in the passage and a piston movable along a transversal axis; wherein at least one of the shutter and the piston shows a recess or opening accommodating the other of said shutter and piston.

According to a preferred embodiment, the transversal axis of the piston crosses the longitudinal axis of the shutter or is distant from said axis by half the diameter of the piston vis-à-vis of the shutter, or less.

According to a preferred embodiment, the shutter comprises a first end engaging with the spindle, a second end with sealing means for cooperating with the seat of the shut-off device, and an intermediate elongate portion extending between said first and second ends.

According to a preferred embodiment, the intermediate elongated portion of the shutter shows the opening accommodating the piston.

According to a preferred embodiment, the opening is oblong along the longitudinal axis of the shutter so as to allow movement of said shutter along said axis.

According to a preferred embodiment, the intermediate elongate portion of the shutter is generally flat with at least one main face and with at least one arc-shaped side face slidingly housed in a longitudinal bore of the body. Advantageously, the elongate portion of shutter comprises two opposed main faces and/or two opposed arc-shaped side faces.

According to a preferred embodiment, the at least one main face of the intermediate elongate portion of the shutter is in sliding contact with a flat face on the body so as to prevent rotation of said shutter. The flat face can be formed by a collar or by the plug, i.e. without a collar.

According to a preferred embodiment, the piston comprises a front portion cooperating in a gas tight manner with the seat of the residual pressure device, and a rear portion of an increased diameter compared with the front portion, said rear portion comprising a gasket slidingly housed in a bore formed in a plug mounted on the body, the flat face in sliding contact with the shutter being supported by said plug.

According to a preferred embodiment, the flat face in sliding contact with the shutter is formed by a collar supported by the plug.

According to a preferred embodiment, the intermediate elongate portion of the shutter shows a mean diameter that is less than a mean diameter of at least one of the first and second ends.

According to a preferred embodiment, the intermediate elongate portion of the shutter extends over the whole of the diameter of the piston vis-à-vis of the shutter.

According to a preferred embodiment, the recess in the piston extends along the transversal axis so as to accommodate the intermediate elongate portion of the shutter along a stroke of said piston.

According to a preferred embodiment, the recess in the piston shows a radial depth of more than a fourth of the diameter of said piston.

According to a preferred embodiment, the piston comprises a main portion and a front portion of a reduced diameter compared with said main portion, said front portion cooperating in a gas tight manner with the seat of the residual pressure device, the recess being provided in the main portion.

According to a preferred embodiment, the main portion comprises a rear end, opposite to the front portion, with a gasket slidingly cooperating with a bore in the body so as to form, between said rear end and said front portion, a chamber for the gas for moving the piston away from the seat of the residual pressure device against a resilient force.

Advantages of the Invention

The invention is particularly interesting in that it provides a valve with a shut-off function and a residual pressure function, where the body shows a substantially reduced volume by means of diameter and height and therefore a substantially reduced mass and coincidently increased stiffness. The production costs of such a valve are therefore reduced, in particular when the body is made of a material, such as brass, which is expensive in relation with the total production cost of the valve because of the high amount of copper. The valve is also more compact which can be advantageous for applications where the space available is limited. This can be the case for gas cylinders of limited height such as those used for medical applications (e.g. oxygen) and housed in a protective cover. Also the invention has for effect that the longitudinal axis of the shut-off device and the transversal axis of the residual pressure device are brought close to each other, or even cross, avoiding sharp-edges at the crossing of the bore housing the shut-off device and the bore housing the residual pressure device. Generally speaking, an offset between those axis requires a further machining operation for each bore to connect sufficiently the two channels in the valve body. Furthermore, an offset design leads to an increased pressure loaded surface and finally to an increased valve body wall thickness compared to an inline design.

DESCRIPTION OF AN EMBODIMENT

Figure 1:
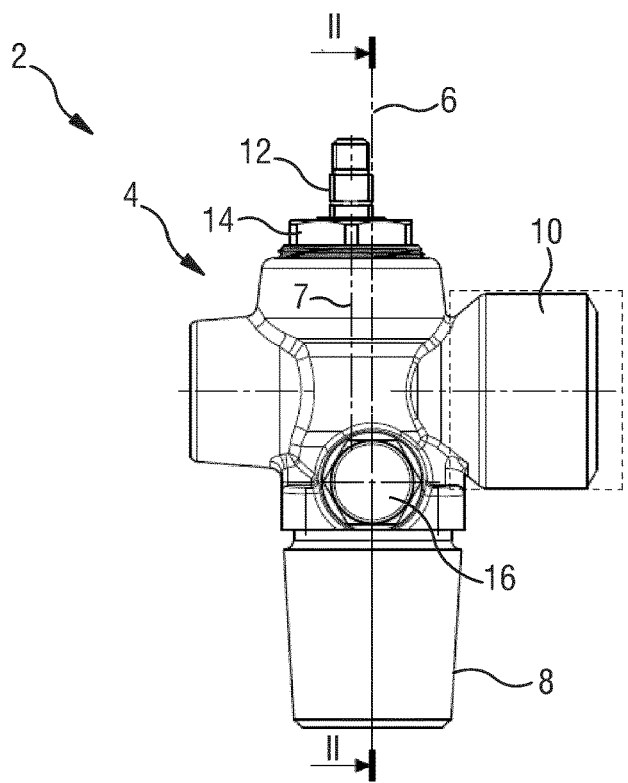
FIG. 1 is a front view of a valve according to a first embodiment of the invention.

FIGS. 1 to 5 illustrate a gas cylinder valve according to a first embodiment of the invention. More specifically, FIG. 1 is a plan view of the valve, FIGS. 2 to 4 different sectional views of the valve in a closed state and FIG. 5 a section view corresponding to FIG. 3, the valve being however in an open state.

In FIG. 1, the valve 2 comprises a body 4 which is advantageously unitary and made of brass, preferably by forging. The body 4 extends along a longitudinal direction 6. It comprises a tapered threaded base portion 8 designed for being mounted in a collar of a gas cylinder and forming a gas inlet of the valve. The body 4 comprises also an outlet portion 10. A spindle 12 is mounted along a longitudinal axis 7 on the top of the body 4 by means of a nut 14. A pressure relief device 16 is mounted on the body 4.

Figure 2:
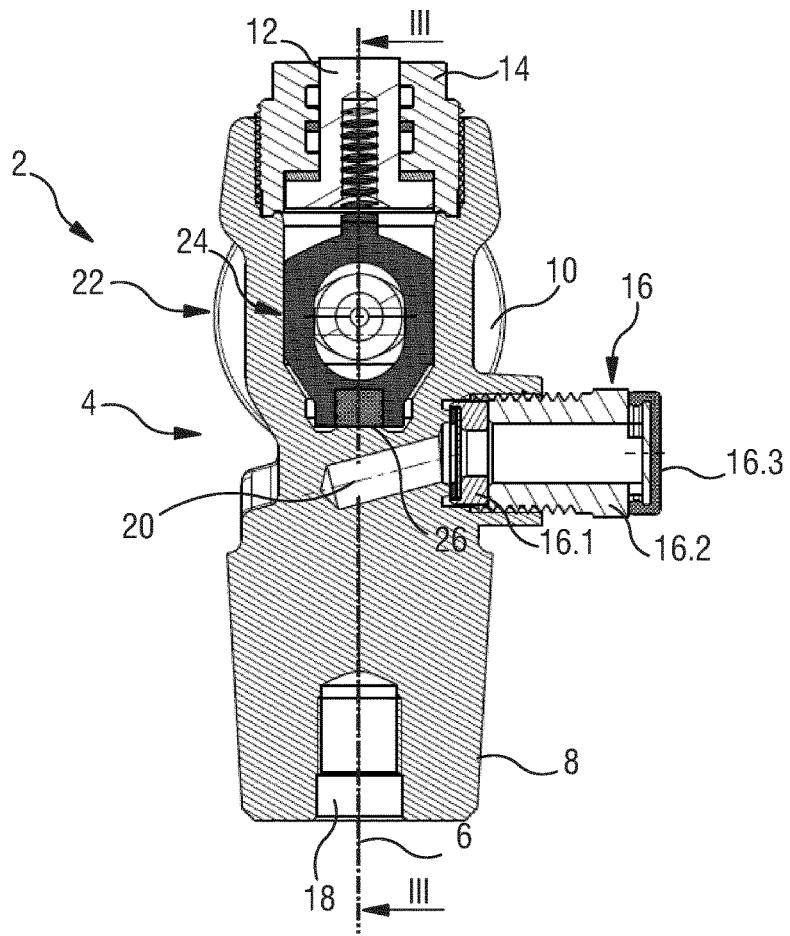
FIG. 2 is a section view II-II of the valve of FIG. 1.

FIG. 2 is a sectional view II-II of the valve of FIG. 1. The threaded base portion 8 of the body 4 forms a gas inlet 18 of the valve 2 and the body 4 comprises a gas passage 20 formed therein interconnecting said gas inlet 18 with a gas outlet in the outlet portion 10.

The pressure relief device 16 comprises an annular member 16.1 carrying a burst disk, a threaded sleeve 16.2 engaged on the body 4 and pressing the annular member 16.1 in a gas tight fashion against a seat formed in the body 4. A cap 16.3 can be provided on the outlet of the pressure relief device 16, i.e. on the outlet of the threaded sleeve. The burst disk is in direct contact with the gas passage 20 formed in the body 4. If the pressure in the gas cylinder and therefore also on the burst disk increases up to a predetermined level, said disk will burst and evacuate the pressure outside of the valve through the sleeve 16.2.

The valve 2 comprises a shut-off device 22, downstream of the pressure relief device 16, comprised essentially of a shutter 24 movable along a longitudinal direction, and a seat 26.

Figure 3:
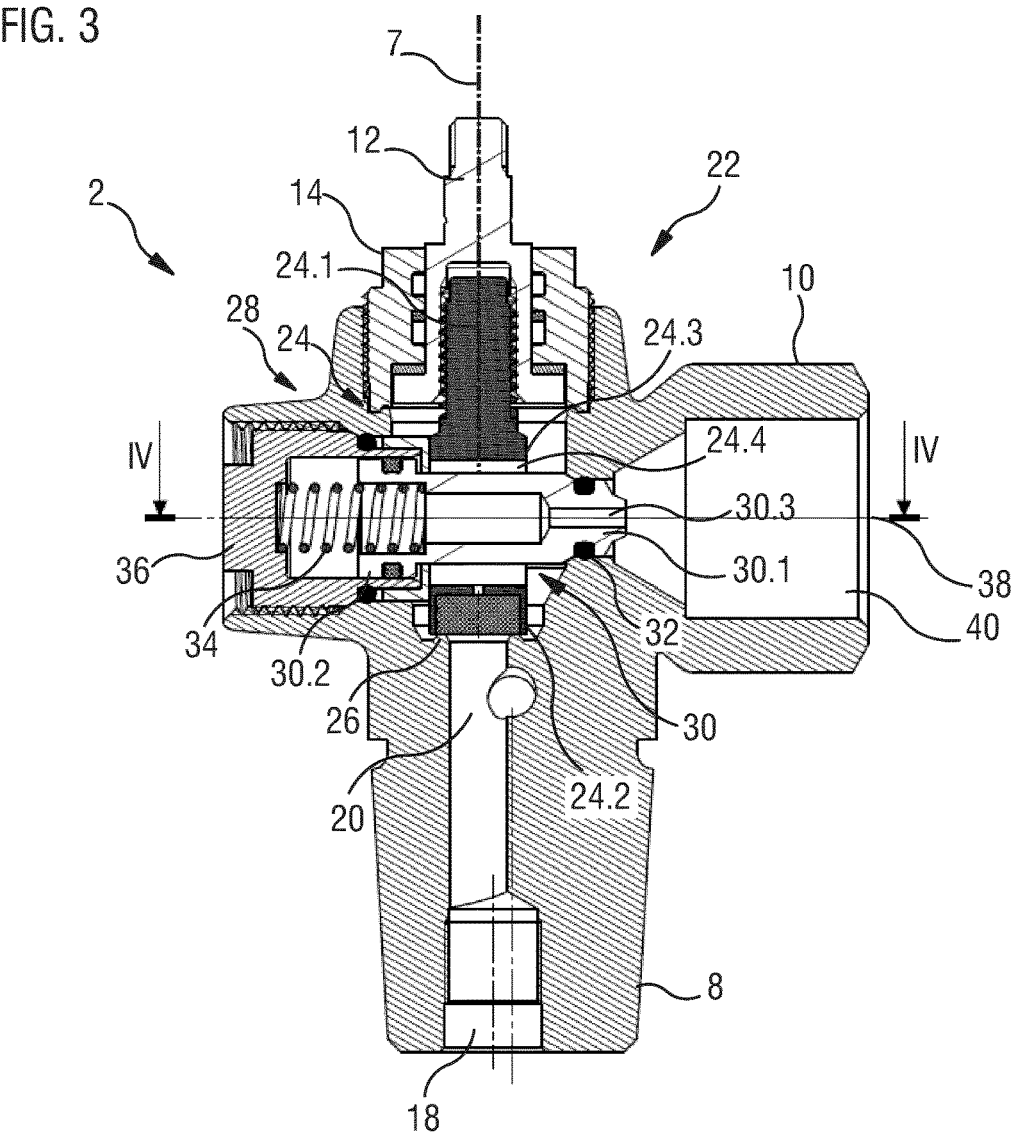
FIG. 3 is a section view III-III of the valve of FIG. 2.

FIG. 3 is a sectional view of the valve of FIG. 1, parallel to the plane of FIG. 1 and perpendicular to section II-II.

As is apparent in FIG. 3, the shutter 24 comprises a first left-hand male threaded end 24.1 that is for instance elongate and cooperating with the spindle 12 for actuating a longitudinal translation of the shutter along the axis 7. For instance, the first end 24.1 forms a stud that engages with a female left-hand thread formed in the spindle 12. The shutter 24 comprises also a second end 24.2 with sealing means, opposed to the first end 24.1 and cooperating with the seat 26. The seat 26 is for instance formed directly in the body 4 and is crossed by the passage 20 for the gas.

As is also apparent in FIG. 3, the valve 2 comprises also a residual pressure device 28 comprised essentially of a piston 30 cooperating with a seat 32, urged toward said seat 32 by a spring 34 resting on a plug 36 mounted on the body 4, for instance by a threaded engagement. The piston 30 extends along a transversal axis 38 through an opening 24.4 formed in an intermediate elongate portion 24.3 of the shutter 24, said portion extending between the first and second ends 24.1 and 24.2.

The residual pressure device 28 is arranged fluidly downstream of the shut-off device 22. The piston 30 comprises a front portion 30.1 that cooperates with the seat 32. The latter is crossed by the passage 20 in direct communication with the valve outlet 40 in the outlet portion 10. For instance, the front portion 30.1 comprises a gasket housed in an outer circular groove and engages in a gas tight manner with the seat 32 so as to close the passage 20 with regard to the valve outlet 40. The rear portion 30.2 is slidingly received in a gas tight fashion in a bore formed in the plug 36. The rear portion 30.2 can comprise a gasket housed in an outer circular groove, said gasket contacting the bore in the plug 36. The effective diameter of the rear portion 30.2 at the level of the gas tight contact with the bore is greater than the effective diameter of the front portion 30.1 at the level of the gas tight contact with the seat 32. In the absence of pressure in the cavity around the piston 30, the spring 34 urges the piston 30 against the seat 32 so as to close the passage. When the shut-off device 22 is opened, gas flows from the cylinder to the cavity around the piston 30 and the pressure in said cavity increases. A biasing force, resulting from the pressure of the gas applied to an annular surface delimited by the effective diameters of the rear and front portions 30.2 and 30.1, is exerted on the piston, moving said piston away from the seat 32 against the resilient force of the spring 34 and opening the passage. The pressure necessary of opening the residual pressure device can be comprised between 1 and 10 bar.

Still with reference to FIG. 3, the piston comprises a channel 30.3 extending axially and connecting the front face of the front portion 30.1 with the chamber delimited by the rear portion 30.2 and the bore of the plug 36. In operation, when the pressure in the gas cylinder drops down below the predetermined level for opening the residual pressure device, said device remains closed. If the outlet portion 10 is connected to a gas refill source, the refill pressure will build up in the chamber delimited by the rear portion 30.2 and the bore of the plug 36 and will then exert a force on the piston urging said piston against the seat 32.

When the pressure in the cavity around the piston 30 is above the predetermined level, the piston remains in an open position due to a pressure drop when passing the seat 32.

Figure 4:
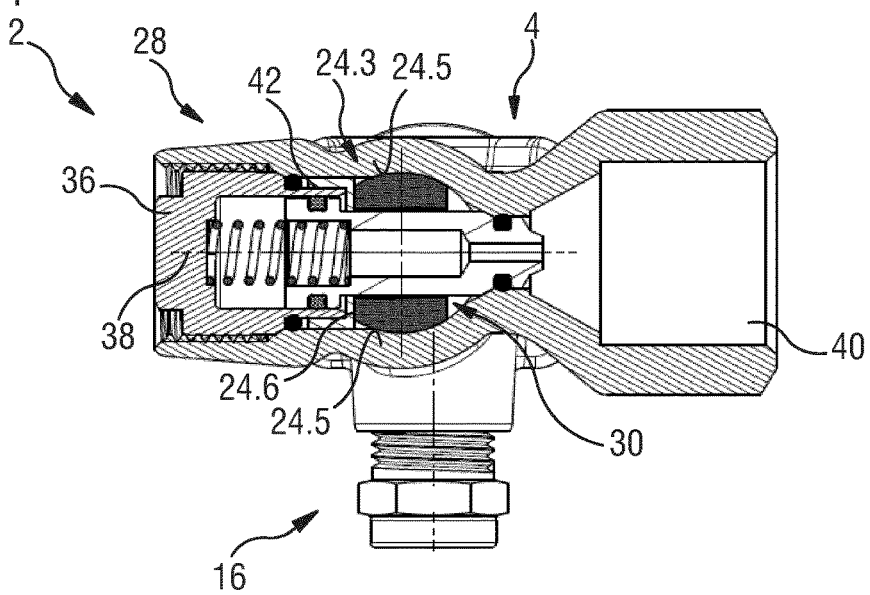
FIG. 4 is a section view IV-IV of the valve in FIG. 3.

FIG. 4 is a sectional view IV-IV of FIG. 3. As is apparent, the shutter 24, more specifically the intermediate elongate portion 24.3 of the shutter 24 is generally flattened and comprises two opposed side faces 24.5 showing a curved profile in sliding contact with a corresponding curved cavity of the body 4. More specifically, the curved profile is arc-shaped and the cavity shows a circular section. The intermediate elongate portion 24.3 of the shutter 24 comprises also two opposed main faces 24.6 where one of said faces is generally flat and in sliding contact with a guiding surface in the cavity of the body 4 so as to prevent rotation of said shutter. The guiding surface is advantageously formed by a collar 42 supported by the plug 36. The collar 42 avoids the rotational degree of freedom of the shutter 24 around the longitudinal axis 7 and coincidently guides the piston 30 along its transversal axis 38. The collar 42 can show an L-shaped cross-section where the radially extending wing of the L shape forms the guiding surface. Also a Z-shape is possible which increases the guidance length of the piston 30.

Figure 5:
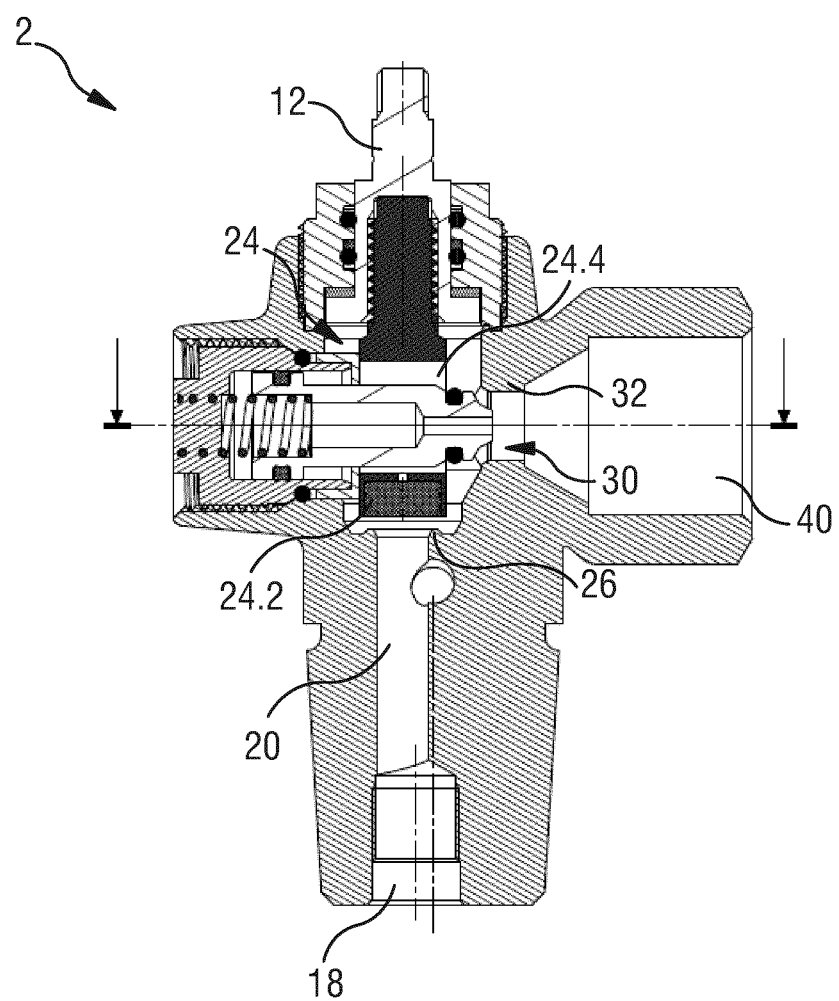
FIG. 5 corresponds to FIG. 3 where the shut-off device is in an open position.

FIG. 5 corresponds to FIG. 3 where however the valve is in an open state. The spindle 12 has been rotated for moving the shutter 24 away from the seat 26 so as to open the gas passage 20. Under the gas pressure present in the cavity around the piston 30 moves said piston away from the seat 32 and opens the gas passage with the outlet 40. With reference to FIG. 2, the opening 24.4 in the shutter is advantageously oblong in the longitudinal direction in order to allow a longitudinal movement of the shutter over its stroke without contacting the piston 30.

Back with reference to FIG. 4, we can observe that the axis 38 of the piston 30 of the residual pressure device 28 crosses the longitudinal axis 7 of the shutter 24 of the shut-off device. This is also apparent in FIG. 2. This means that the body 4 does not require anymore a bulky lateral portion as in the prior art. The body 4 can therefore be optimized with regard to the mass of material, for instance brass, needed. In addition, the valve 2 shows a compact design which is, irrespective of the material gain, advantageous for applications where a limited volume is provided and a high resistance against side impact loads is required for safety reasons. Also, the fluid connection between the shut-off device and the residual pressure device is automatically achieved by the cavity housing the shutter of said shut-off device. In the prior art, this connexion is usually achieved by the crossing of a longitudinal bore for housing the shut-off device and a transversal bore for housing the residual pressure device. Machining these bores usually requires an inspection and potentially a removal of burrs produced at the crossing of these bores.

Figure 6:
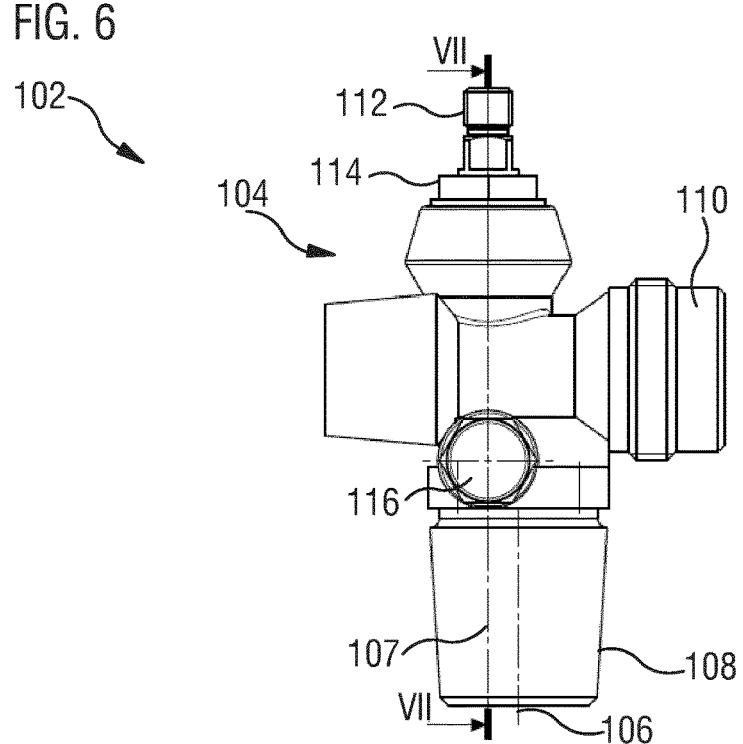
FIG. 6 is a front view of a valve according to a second embodiment of the invention.

FIGS. 6 to 9 illustrate a gas cylinder valve according to a second embodiment of the invention. More specifically, FIG. 6 is a plan view of the valve and FIGS. 7 to 9 different sectional views of the valve in a closed state. The reference numbers of the first embodiment are used here for designating the same or corresponding elements, these numbers being however incremented by 100. It is also referred to the description of these elements in relation with the first embodiment.

In FIG. 6, similarly to the valve illustrated in FIG. 1, the valve 102 comprises a body 104 with a longitudinal axis 106, an inlet portion 108, an outlet portion 110, a spindle 112 held by the nut 114, and a pressure relief device 116. The spindle 112 extends along a longitudinal axis 107 that is for instance distinct from the longitudinal axis 106 of the body 104.

Figure 7:
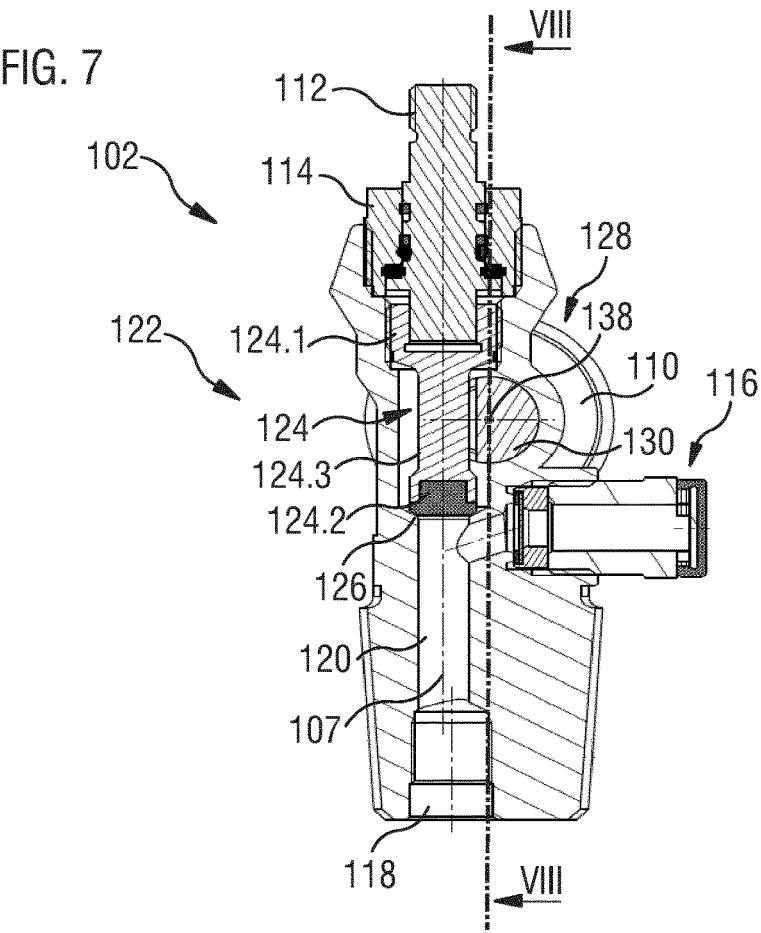
FIG. 7 is a section view VII-VII of the valve of FIG. 6.

FIG. 7 is a sectional view VII-VII of the valve in FIG. 1. Similarly to the illustration in FIG. 2, the valve 102 comprises a shut-off device 122 comprised essentially of a shutter 124 and a seat 126, the shutter 124 being movable along the longitudinal axis 107 for cooperating with the seat 126. More specifically, the shutter 124 comprises a first end 124.1 cooperating with the spindle 112, a second end 124.2 with sealing means cooperating with the seat 126 and an intermediate elongate portion 124.3. For instance, the first end 124 comprises an external thread engaged with a corresponding internal thread in the body 104, and a non-circular cavity receiving a corresponding non-circular end of the spindle 112. The spindle 112 is therefore in rotational engagement with the shutter 124 whereas said shutter can move longitudinally relative to the spindle 112. In other words, a rotation of the spindle 112 will cause rotation of the spindle 124, said rotation causing a translation due to the thread engagement of the first end 124.1 with the body 104.

Similarly to the valve of the first embodiment, the valve 102 comprises also a residual pressure device 128 which is only partially visible in FIG. 7. The residual pressure device 128 comprises a piston 130 that is slidable along the axis 138 and that is recessed for accommodating the intermediate portion 124.3 of the shutter 124.

Figure 8:
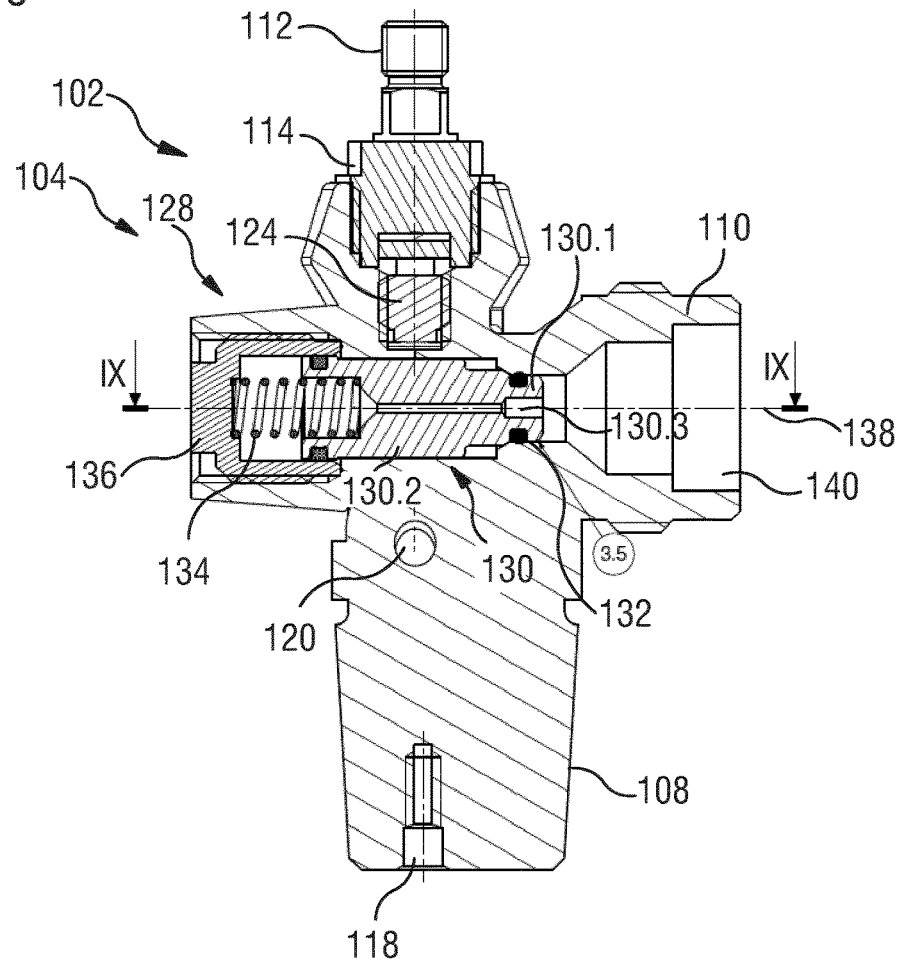
FIG. 8 is a section view VIII-VIII of the valve of FIG. 7, perpendicular to the section view of FIG. 7.

FIG. 8 is a section view VIII-VIII of the valve in FIG. 7, parallel to the plane of FIG. 6 and perpendicular to section VII-VII. The section illustrated in FIG. 8 comprises the transversal axis 138 of the piston 130 of the residual pressure device 128. Similarly to the first embodiment, the residual pressure device 128 is fluidly connected between the shut-off device and the outlet 140. The piston 130 comprises a front portion 130.1 that cooperates in a gas tight manner with a seat 132 of the residual pressure device 128. The piston 130 comprises also a main portion 130.2 with a rear end that is slidably received in gas tight fashion in a bore formed in the body, for instance in a plug 136 mounted on the body 104. The effective diameter of the rear end cooperating in gas tight fashion with the bore is larger than the effective diameter of the front portion 130.1 cooperating in a gas tight fashion with the seat 132. Consequently, when the pressure in the cavity around the piston 130 reaches a predetermined level, the resulting force on the piston 130 moves said piston away from the seat 132 against the resilient force of the spring 134 so as to open the passage with the outlet 140. Similarly to the first embodiment, the piston 130 can comprise a central channel 130.3 fluidly interconnecting the front face of the piston, on the front portion 130.1, with the rear face of the piston, on the rear end of the main portion 130.2.

Figure 9:
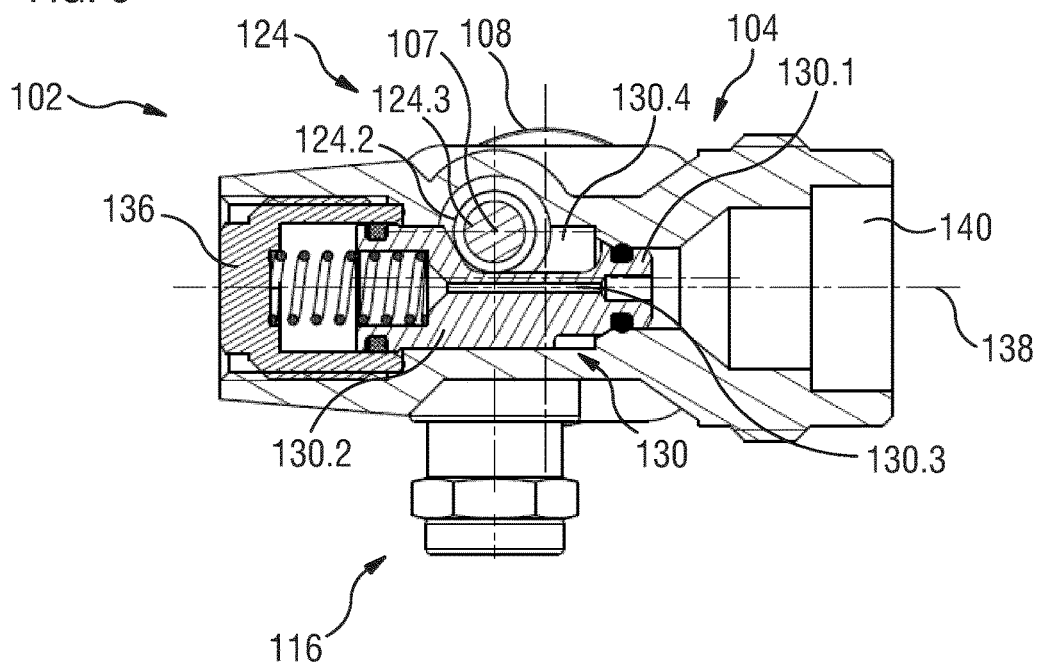
FIG. 9 is a section view IX-IX of the valve in FIG. 8.

FIG. 9 is a sectional view IX-IX of FIG. 8. As is apparent, the piston 130 shows a recess 130.4 on the main portion 130.2, providing space that accommodates the intermediate elongate portion 124.3 of the shutter. As is apparent, the recess 130.4 is advantageously elongate along the axis 138 of the piston 130 in order to allow an operational translation of the piston 130 without interference with the shutter. The channel 130.3 formed in the piston shows advantageously a reduced diameter in order to provide enough plain material for machining the recess without interference with said channel.

As is apparent in FIG. 9 and also in FIG. 7, the axis 107 of the shut-off device is distant from the axis 138 of the residual pressure device. These axes are however close to each other thanks essentially to the recess 130.4 in the piston 130 and accommodating the intermediate elongate portion 124.3 of the shutter. This arrangement reduces therefore in a substantial manner the size and volume of the bulky portion in the body for housing the residual pressure device, and therefore the amount of material necessary for the body. For instance, with reference to FIGS. 7 and 9, the body 104 shows two very limited bulky areas, namely a first one around the piston 130 (FIG. 7) and a second one around the shutter 124 (FIG. 9). The body shows therefore a reduced volume compared with the prior art. The valve is also more compact. Similarly to the first embodiment, bringing close to each other the residual pressure device and the shut-off device provides also an advantage in the machining process of the body in that the fluid communication between the shut-off device and the residual pressure device is readily provided without sharp angled crossings between the longitudinal bore housing the shut-off device and the transversal bore housing the residual pressure device.

The invention claimed is:

1. Gas cylinder valve, comprising:
   a body with an inlet, an outlet, and a passage fluidly interconnecting said inlet and outlet;
   a shut-off device with a seat formed in the passage and a shutter movable along a longitudinal axis for cooperating with said seat;
   a spindle rotatably mounted on the body along the longitudinal axis and cooperating with the shutter such as to move said shutter upon rotation of said spindle; and
   a residual pressure device fluidly downstream of the shut-off device, with a seat formed in the passage and a piston movable along a transversal axis;
   wherein at least one of the shutter and the piston shows a recess or opening accommodating the other of said shutter and piston.

2. Gas cylinder valve according to claim 1, wherein the transversal axis of the piston crosses the longitudinal axis of the shutter or is distant from said axis by half the diameter of the piston vis-à-vis of the shutter, or less.

3. Gas cylinder valve according to claim 1, wherein the shutter comprises:
   a first end engaging with the spindle;
   a second end with sealing means for cooperating with the seat of the shut-off device; and
   an intermediate elongate portion extending between said first and second ends.

4. Gas cylinder valve according to claim 3, wherein the intermediate elongate portion of the shutter shows the opening accommodating the piston.

5. Gas cylinder valve according to claim 4, wherein the opening is oblong or circular along the longitudinal axis of the shutter, so as to allow movement of said shutter along said axis.

6. Gas cylinder valve according to claim 4, wherein the intermediate elongate portion of the shutter is generally flat with at least one main face and with at least one side arc-shaped side faces slidingly housed in a longitudinal bore of the body.

7. Gas cylinder valve according to claim 6, wherein the at least one main face of the intermediate elongate portion of the shutter is in sliding contact with a flat face on the body so as to prevent rotation of said shutter.

8. Gas cylinder valve according to claim 7, wherein the piston comprises:
   a front portion cooperating in a gas tight manner with the seat of the residual pressure device; and
   a rear portion of an increased diameter compared with the front portion, said rear portion comprising:
      a gasket slidingly housed in a bore formed in a plug mounted on the body, the flat face in sliding contact with the shutter being supported by said plug.

9. Gas cylinder valve according to claim 8, wherein the flat face in sliding contact with the shutter is formed by a collar supported by the plug.

10. Gas cylinder valve according to claim 3, wherein the intermediate elongate portion of the shutter shows a mean diameter that is less than a mean diameter of at least one of the first and second ends.

11. Gas cylinder valve according to claim 3, wherein the intermediate elongate portion of the shutter extends over the whole of the diameter of the piston vis-à-vis of the shutter.

12. Gas cylinder valve according to claim 3, wherein the recess in the piston extends along the transversal axis, so as to accommodate the intermediate elongate portion of the shutter along a stroke of said piston.

13. Gas cylinder valve according to claim 12, wherein the recess in the piston shows a radial depth of more than a fourth of the diameter of said piston.

14. Gas cylinder valve according to claim 12, wherein the piston comprises:
   a main portion; and
   a front portion of a reduced diameter compared with said main portion, said front portion cooperating in a gas tight manner with the seat of the residual pressure device, the recess being provided in the main portion.

15. Gas cylinder valve according to claim 14, wherein the main portion comprises:
   a rear end, opposite to the front portion, with a gasket slidingly cooperating with a bore in the body, so as to form, between said end and said front portion, a chamber for the gas for moving the piston away from the seat of the residual pressure device against a resilient force.

* * * * *